US012733626B1

(12) United States Patent
Anderson

(10) Patent No.: US 12,733,626 B1
(45) Date of Patent: Sep. 15, 2026

(54) LIVESTOCK ANIMAL SUBSTANCE APPLICATION SYSTEM

(71) Applicant: Lyle Anderson, Whitehorse, SD (US)

(72) Inventor: Lyle Anderson, Whitehorse, SD (US)

( * ) Notice: Subject to any disclaimer, the term of this patent is extended or adjusted under 35 U.S.C. 154(b) by 0 days.

(21) Appl. No.: 19/062,145

(22) Filed: Feb. 25, 2025

(51) Int. Cl.
*A01K 13/00* (2006.01)
*A01K 5/01* (2006.01)

(52) U.S. Cl.
CPC .............. *A01K 13/003* (2013.01); *A01K 5/01* (2013.01)

(58) Field of Classification Search
CPC ................................ A01K 13/003; A01K 5/01
USPC .......................................................... 119/666
See application file for complete search history.

(56) References Cited

U.S. PATENT DOCUMENTS 3,137,274 A * 6/1964 Palmer ................. A01K 5/0142 119/657
4,567,856 A * 2/1986 Sorenson ............. A01K 13/003 119/666
4,580,529 A * 4/1986 Wilson ................. A01K 13/003 119/62
5,056,467 A * 10/1991 Schaefer .................. A01K 5/01 119/666
5,740,757 A * 4/1998 Smeester .............. A01M 13/00 119/51.02
5,988,113 A * 11/1999 Zhioua ................. A01K 13/003 119/657
9,339,009 B1 * 5/2016 Larson ................. A01K 13/003
2019/0387708 A1 * 12/2019 Fussell, Jr. ........... A01K 13/003
2020/0128790 A1 * 4/2020 Ledbetter ............. A01K 13/003

* cited by examiner

*Primary Examiner* — Kimberly S Berona
*Assistant Examiner* — Erica Michelle Huebner
(74) *Attorney, Agent, or Firm* — Jeffrey A. Proehl; Woods, Fuller, Shultz & Smith PC

(57) ABSTRACT

A dispensing apparatus for a feeder apparatus to dispense a substance onto the body of an animal may comprise a spray assembly to dispense the substance on the animal when a portion of the body of the animal moves into the feeder apparatus. The sprayer assembly may include one or more spray nozzles for mounting on a feeder hood above and/or below an opening into the hood for spraying the substance onto the body of the animal. The dispensing apparatus may also include a holding tank for holding the substance that may be pressurized. The tank fluidly communicates with the nozzle(s) through a valve selectively controlling flow to the nozzle(s). A tank pressurizing mechanism may increase gas pressure in the tank interior. A controller assembly may open the valve when movement of the portion of the body of the animal into the hood is sensed.

19 Claims, 4 Drawing Sheets

LIVESTOCK ANIMAL SUBSTANCE APPLICATION SYSTEM

BACKGROUND

Field

The present disclosure relates to apparatus for applying substances to animals for preventative or prophylactic purposes, and more particularly pertains to a new livestock animal substance application system for treating animals in a less obtrusive and more effective manner.

SUMMARY

In one aspect, the present disclosure relates to an animal substance application system for applying a substance on a portion of a body of an animal. The system may comprise a feeder apparatus which may include a feeder hood having an interior for holding a quantity of feed and receiving a portion of the body of the animal consuming the feed. The feeder hood may have an opening through which the portion of the body of the animal is movable into the interior of the feeder hood. The feeder hood has a top and a bottom. The feeder apparatus may also include a support base for supporting the feeder hood in an elevated condition above a ground surface. The system may also include a dispensing apparatus configured to dispense the substance onto areas of the body of the animal when the animal has moved the portion of the body into the interior of the feeder hood through the opening. The dispensing apparatus may comprise a sprayer assembly mounted on the feed hood. The sprayer assembly may include a first spray nozzle mounted on the feeder hood above the opening of the feeder hood. The first spray nozzle may be oriented to spray the substance downwardly from above the opening toward the body of the animal when the portion of the body of the animal is received in the interior of the feeder hood. The sprayer assembly may also include a holding tank for holding in a tank interior a quantity of the substance to be dispensed. The holding tank may be closed to permit pressurization of the tank interior. The sprayer assembly may further include dispensing conduit fluidly connecting the first spray nozzle to the holding tank. The sprayer assembly may include a valve configured to selectively permit and prevent fluid flow through the dispensing conduit from the holding tank to the first spray nozzle. The valve may have an open condition and a closed condition. The sprayer assembly may also include a valve actuating device configured to actuate the valve from the closed condition to the open condition. The sprayer assembly may further include a tank pressurizing mechanism configured to increase a pressure of gas in the tank interior of the holding tank. The system may include a controller assembly for operating the valve actuating device of the sprayer assembly.

In another aspect, the disclosure relates to a dispensing apparatus for associating with a feeder apparatus to dispense a substance onto areas of a body of an animal when the animal moves proximate to the feeder apparatus. The feeder apparatus may be of the type including a feeder hood having an interior for holding a quantity of feed and receiving a portion of the body of the animal through an opening into the interior when the animal consumes the feed. The dispensing apparatus may comprise a spray assembly configured to dispense the substance on the animal when the portion of the body of the animal is moved into the interior of the feeder hood. The sprayer assembly may include a first spray nozzle configured to be mounted on the feeder hood above the opening of the feeder hood and be oriented to spray the substance downwardly from above the opening toward the body of the animal when the portion of the body of the animal is received in the interior of the feeder hood. The sprayer assembly may also include a second spray nozzle configured to be mounted on the feeder hood below the opening of the feeder hood and be oriented to spray the substance upwardly from below the opening toward the body of the animal when the portion of the body of the animal is received in the interior of the feeder hood. The sprayer assembly may further include a holding tank for holding in a tank interior a quantity of the substance to be dispensed, with the holding tank being closed to permit pressurization of the tank interior. The sprayer assembly may have dispensing conduit fluidly connecting the first spray nozzle and the second spray nozzle to the holding tank. The sprayer assembly may include a valve configured to selectively permit and prevent fluid flow through the dispensing conduit from the holding tank to the first and second spray nozzles. The valve having an open condition and a closed condition. The sprayer assembly may also include a valve actuating device configured to actuate the valve from the closed condition to the open condition. The sprayer assembly may further include a tank pressurizing mechanism configured to increase a pressure of gas in the tank interior of the holding tank. The dispensing apparatus may comprise a controller assembly for operating the valve actuating device of the sprayer assembly.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, as well as the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
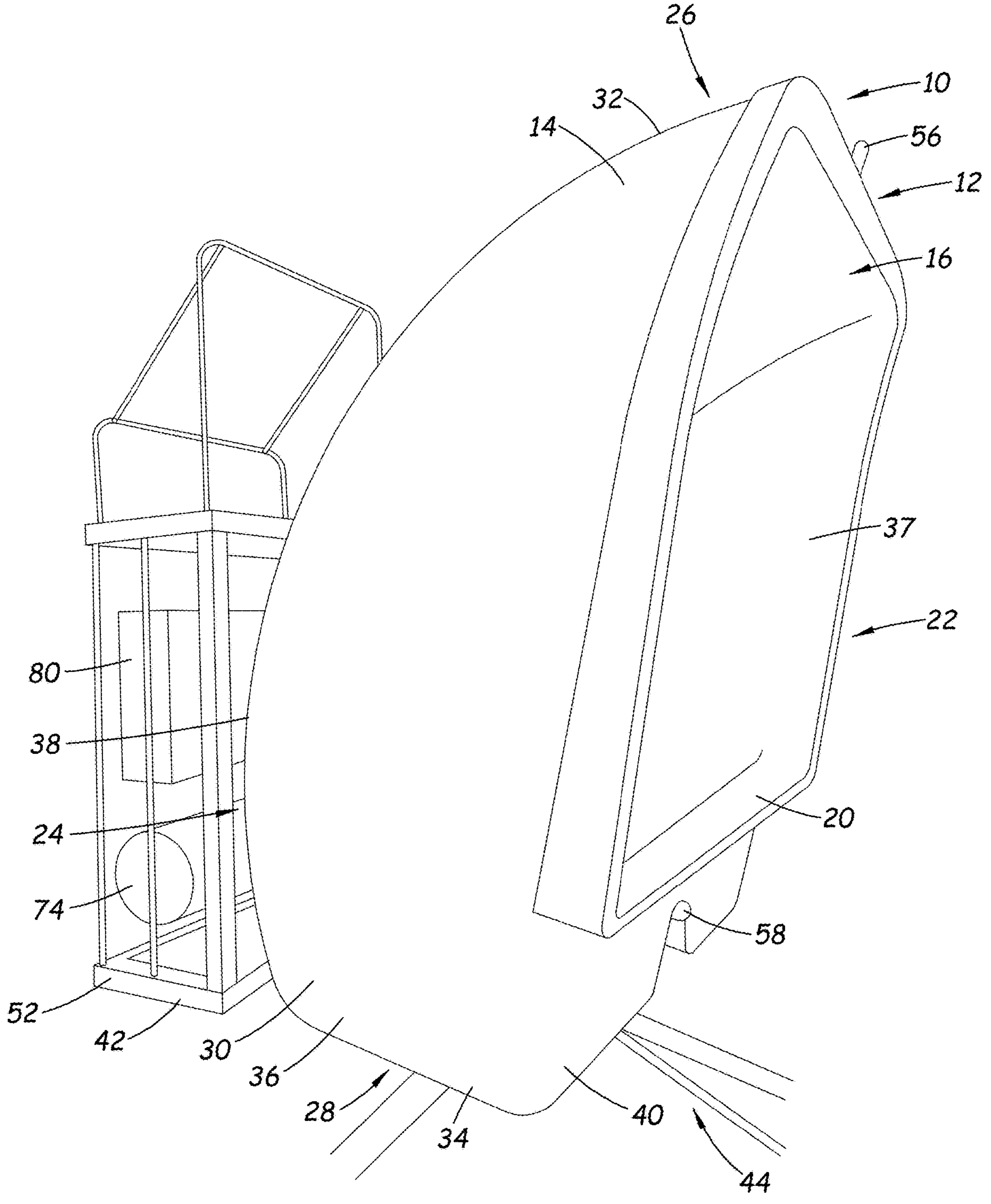
FIG. 1 is a schematic side perspective view of a new livestock animal substance application system according to the present disclosure.
Figure 2:
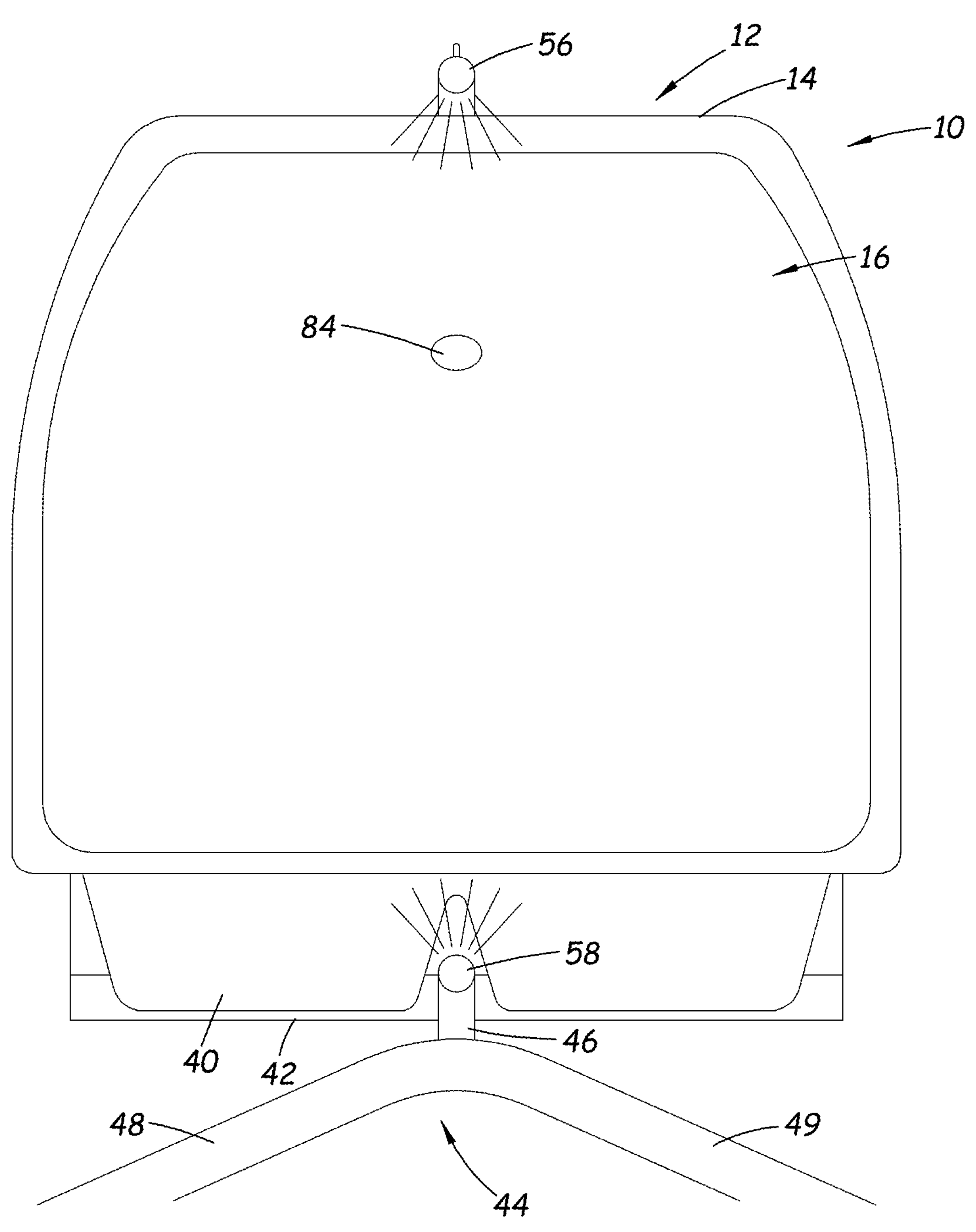
FIG. 2 is a schematic front view of the feeder apparatus with elements of the dispensing apparatus of the system, according to an illustrative embodiment.
Figure 3:
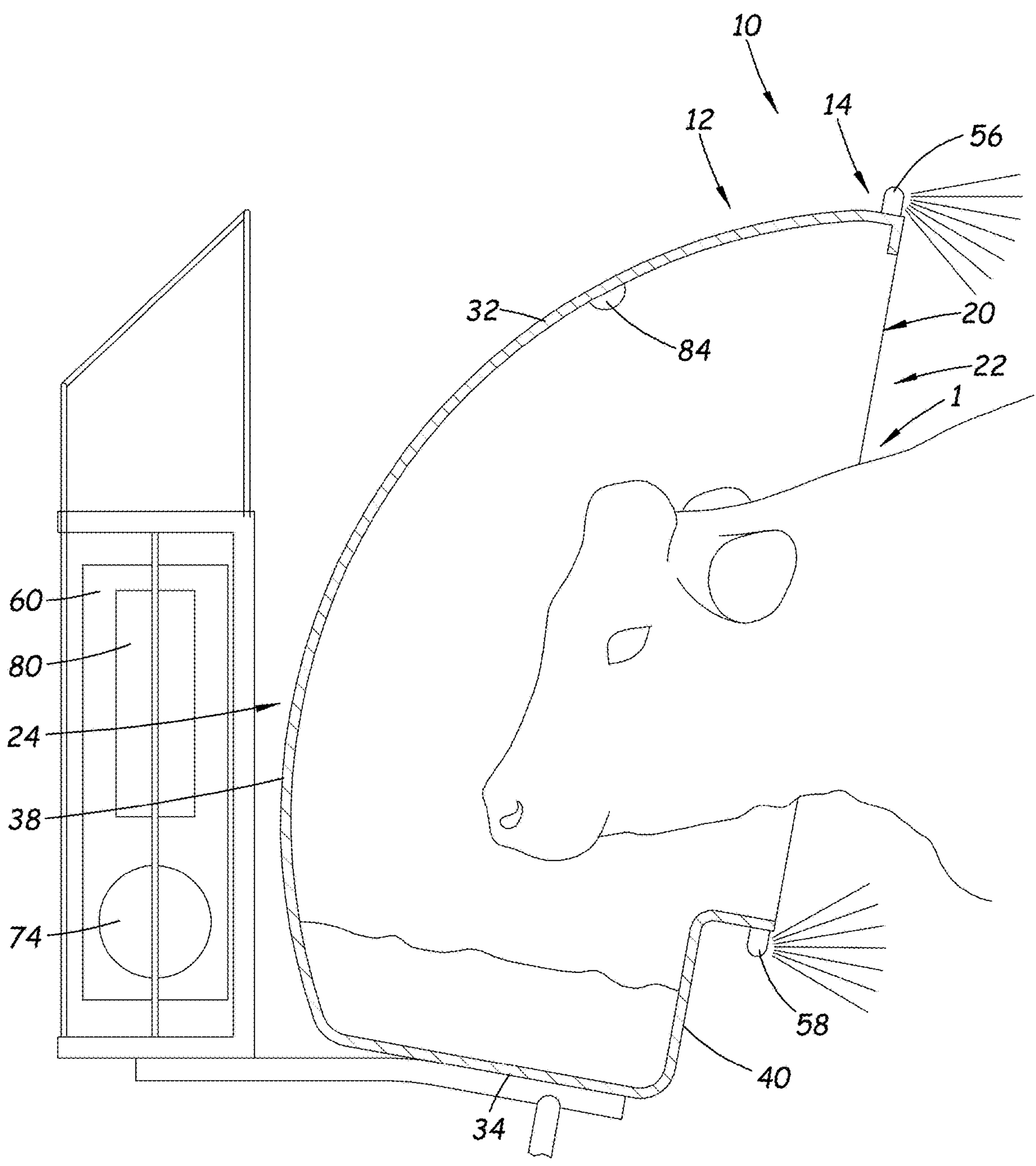
FIG. 3 is a schematic side sectional view of the feeder apparatus and dispensing apparatus of the system, according to an illustrative embodiment.
Figure 4:
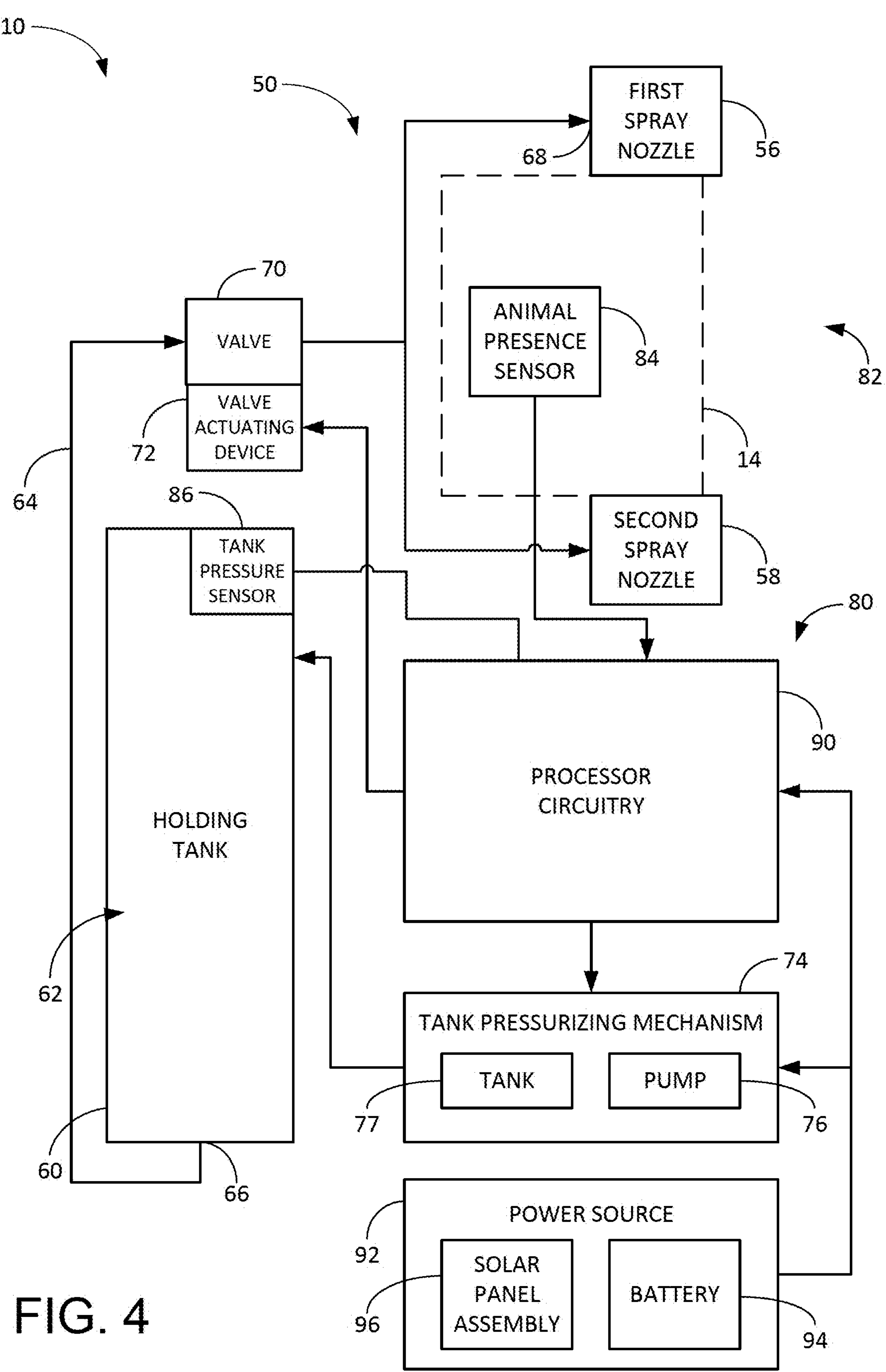
FIG. 4 is a schematic block diagram of elements of the dispensing apparatus, according to an illustrative embodiment.

With reference now to the drawings, and in particular to FIGS. 1 through 4 thereof, a new livestock animal substance application system embodying the principles and concepts of the disclosed subject matter will be described.

Livestock producers and others responsible for the care of animals have utilized the application of a pest deterrent substance on the body of the animal to deter flying insects and other pests from landing on the body of the animal that may lead to detrimental effects. Typically, the pest deterrent substance is in the form of a liquid.

Various apparatus have been developed for applying the substance, which is typically in the form of liquid, to the body of the animal. One illustrative apparatus utilizes a fibrous rope that absorbs and conducts the substance and that is suspended in a manner that permits animals to contact and rub their bodies against the rope to transfer and apply the substance to the surface of the animal's body.

The applicant has recognized that such apparatus, while highly useful for applying the substance to larger portions of the body of the animal generally between the front and rear legs, are less effective for applying the substance to the head and the area of the body around the head of the animal, potentially leaving these areas exposed to the pests.

The applicant has developed a system for applying a substance, such as a pest deterrent substance, to areas of the body of an animal such as the head and body surface is adjacent to the head. Advantageously, the system may perform the substance application with little or minimal disturbance of the animals that might tend to dissuade or scare the animals from approaching the apparatus of the system and receiving application of the substance. Generally, features of the system may reduce the number of times that noisy elements of the apparatus operate.

For example, the use of a pump to periodically operate to pressurize the interior of a tank holding the substance, thereby forcing the substance through one or more spray nozzles, advantageously permits the pump to operate less frequently than if the pump were to simply directly pump the substance through the spray nozzles, and also avoids the need to operate the pump just when the animal is close by and attempting to feed from the feeder apparatus.

Beneficially, features of the system may enhance the likelihood that the substance will be applied to the areas of the body most effective for pest deterrence, while minimizing the opportunities for over application to a single animal. For example, delays in the timing of the operation of the system may increase the chances that the animal is properly positioned with respect to the application apparatus and decrease the chances that the substance will be applied to the same animal during the same feeding occasion by the animal.

In some aspects, the disclosure relates to a livestock animal substance application system 10 for applying a substance onto a portion of the body 1 of a livestock animal, and particularly on areas of the body about the head 2 of the animal, although it should be recognized that the apparatus may be utilized for applying substance to animals which are not typically considered to be livestock. Illustratively, the substance may comprise a pest deterrent substance, although substances with other purposes or effects may also be utilized in the system. In general, the system 10 may be configured to apply the pest deterrent substance by spraying the substance onto the surface of the body of the livestock animal. The system 10 may also be configured to spray the substance onto the livestock animal while the animal is otherwise occupied with another task, such as when the animal is feeding on materials such as mineral feed.

In embodiments, the system 10 may include a feeder apparatus 12 which is configured to hold a quantity of feed, such as mineral feed containing minerals beneficial to the animal. Illustrative embodiments of the feeder apparatus 12 may also be configured to receive at least a portion of the body of the livestock animal, such as the head and a portion of the neck of the animal.

In the illustrative embodiments, the feeder apparatus 12 may comprise a feeder hood 14 which has an interior 16 for holding a quantity of feed and is generally able to receive a portion of the body of the livestock animal, such as the head. The feeder hood 14 may have an opening 20 through which the body portion of the animal may be moved into the interior 16 of the hood. The feeder hood 14 may generally have a front 22 and a rear 24, and a top 26 and a bottom 28.

The feeder hood may include a hood tub 30 which defines the interior 16 of the feeder hood, and may have a top wall portion 32, a bottom wall portion 34, a pair of side wall portions 36, 37 each extending between the top and bottom wall portions, a rear wall portion 38, and a front wall portion 40. The wall portions may be portions of a single molding or casting, or may be assembled from separate pieces. The front wall portion 40 may be located below the opening 20 of the feeder hood, and the top wall portion and the side wall portions may also be located about the opening. The feeder hood may further include a hood frame 42 on which the hood tub 30 rests such that the hood frame is positioned below the hood tub. The hood frame 42 may be positioned below the bottom wall portion 34 of the hood tub, and the hood frame may be suitably attached or fastened to the tub at the bottom wall portion.

The feeder apparatus 12 may further comprise a support base 44 for supporting the feeder hood 14 in an elevated condition above the ground surface, and may be located below the bottom of the feeder hood. In the illustrative embodiments, the support base 44 may include a hub structure 46 on which the feeder hood 14 is mounted, and the feeder hood may be rotatable with respect to the hub structure. The support base 44 may also include a leg structure 48 that supports the hub structure 46 above the ground surface. In embodiments, the leg structure 48 may include at least one leg 49 for resting on the ground surface, and may include a plurality of legs which may extend generally outwardly and downwardly from the hub structure.

The system 10 may also include a dispensing apparatus 50 configured to dispense the pest deterrent substance onto portions of the body of the livestock animal when the livestock animal is proximate to the feeder apparatus 12, such as when the animal is feeding on feed in the interior of the feeder hood and has its head moved into the opening 20 of the hood. In some embodiments, the disclosure contemplates the system 10 including the feeder apparatus 12 and the dispensing apparatus 50, while the disclosure also contemplates the system 10 including elements of the dispensing apparatus 50 which may be utilized as an assembly or as a kit to retrofit a feeder apparatus.

In embodiments, the dispensing apparatus 50 may have a frame 52 for positioning adjacent to the feeder apparatus 12. The frame 52 may be mountable, or may be mounted, on the feeder hood 14, and may be movable with the hood as a hood moves with respect to the support base 44.

The dispensing apparatus 50 may also have a sprayer assembly 54 which is mounted, or mountable, on the feed hood 14. The sprayer assembly 54 may include at least one spray nozzle 56 that is mounted, or mountable, on the feed hood 14, and in some preferred embodiments includes a pair of spray nozzles 56, 58.

In the illustrative embodiments, the pair of spray nozzles include a first spray nozzle 56 configured to spray the deterrent substance onto areas of the body of the livestock animal, and may be configured to spray the deterrent substance onto the head and back of the neck and body of the livestock animal. The first spray nozzle 56 may be configured to spray the deterrent substance outwardly from the feeder hood 14 and may also spray downwardly from the hood tub 30. The first spray nozzle 56 may be positionable, or positioned, on the tub 30 to spray the deterrent substance from a location above the opening 20 of the feeder hood. The first spray nozzle 56 may be positionable, or positioned, on the top 26 of the feeder hood, and may be mounted on the top wall portion 32 of the hood tub.

Additionally, a second spray nozzle 58 may also be configured to spray the deterrent substance onto areas of the body of the livestock animal, and may be configured to spray deterrent substance onto the neck and shoulders of the body of the livestock animal. The second spray nozzle 58 may be configured to spray the deterrent substance outwardly from the hood tub 30. The second spray nozzle 58 may be positionable, or positioned, to spray the deterrent substance from a location below the opening 20 of the feeder hood. The second spray nozzle 58 may be positionable, or position, on the bottom of the feeder hood 14, and may be mounted on the front wall portion 40 of the hood tub or optionally may be mounted on the bottom wall portion 34.

The sprayer assembly 54 may also include a holding tank 60 for holding a quantity of the pest deterrent substance to be dispensed, and the substance may be contained in a tank interior 62 of the tank 60. In embodiments, the holding tank 60 may be closed or sealed in a manner effective to permit pressurization of the tank interior. The holding tank 60 may be mounted on the frame 52 to provide support of the tank. The sprayer assembly 54 may further include dispensing conduit 64 which is configured to place the spray nozzle or nozzles in fluid communication with the holding tank 60. The dispensing conduit 64 may thus be connected to the holding tank and to the nozzle or nozzles. The dispensing conduit 64 has an entry end 66 connected to the holding tank and an exit end 68 connected to the spray nozzle. When multiple spray nozzles are utilized, the conduit 64 may have multiple exit ends 68, such as in a y-configuration. The entry end 66 may be located toward a bottom of the tank interior to facilitate communication with fluid sitting in the tank interior.

The sprayer assembly 54 may have a valve 70 configured to selectively permit and prevent fluid flow through the dispensing conduit 64. The valve 70 may have an open condition characterized by the deterrent substance being able to flow through the valve, and therefore from the tank 60 to one or more of the nozzles. The valve 70 may also have a closed condition characterized by the deterrent substance not being able to flow through the valve and being blocked from flowing from the tank to the nozzles. A valve actuating device 72 of the sprayer assembly may be configured to operate or actuate the valve 70 from the closed condition to the open condition, and optionally from the open condition to the closed condition. The valve actuating device 72 may be activated by receiving a valve actuating signal or activating current, and the device may be configured to move the valve to the open condition at receipt of the valve actuating signal, and may maintain the valve in the open condition during the receipt of the valve actuating signal. Illustratively, the valve actuating device 72 may comprise a solenoid which receives and is operated by the valve actuating signal.

The tank pressurizing mechanism 74 may have a pressure conduit 78 which connects the pump 76 to the holding tank 60 such that the pressure conduit is in communication with the interior 62 of the tank as well as the pump. In greater detail, the pressure conduit has a pump end connected to the pump and a tank end connected to the holding tank so that gas pumped by the pump 76 is able to reach the tank interior 62.

The tank pressurizing mechanism 74 may have a pressure conduit 78 which connects the pump 76 to the holding tank 60 such that the pressure conduit is in communication with the interior 62 of the tank as well as the pump. In greater detail, the pressure conduit has a pump end 77 connected to the pump and a tank end 79 connected to the holding tank so that gas pumped by the pump 76 is able to reach the tank interior 62.

The dispensing apparatus 50 may also include a controller assembly 80 for operating elements or aspects of the dispensing apparatus. The controller assembly 80 may include sensor circuitry 82 which includes at least one sensor for sensing or detecting conditions of elements of the system and/or conditions of the environment of the system.

In illustrative embodiments, the sensor circuitry 82 may include an animal presence sensor 84 which is configured to detect the presence of a livestock animal proximate to the feeder apparatus, such as when the animal is feeding from the feeder hood 14. In embodiments, the animal presence sensor 84 may be configured to detect insertion of the head 2 of the livestock animal into the interior 16 of the feeder hood. The animal presence sensor 84 may produce or generate a presence detection signal when the animal is detected proximate to the hood. For example, the animal presence sensor 84 may produce the presence detection signal upon the initial or first detection of the animal presence, such as after a period of not detecting (e.g., non-detection) of the animal presence. Illustratively, the present sensor 84 may be configured so that the presence of the animal is detected when a portion of the body of the livestock animal, such as the head, is located in the interior of the feeder hood. The animal presence sensor 84 may be mounted on the feeder hood with the field of focus of the sensor being directed into the interior 16. In some embodiments, the animal presence sensor 84 may be mounted on the rear wall portion 38 of the hood tub, and in some embodiments the animal presence sensor may be mounted on one or both of the side wall portions 36, 37 of the hood tub, such as in opposed locations on the tub. Other positions of the sensor 84 may also be suitable.

The sensor circuitry 82 may also include a tank pressure sensor 86 which is configured to sense pressure in the tank interior 62 of the holding tank, and the sensor may be positioned with respect to the tank interior to sense the pressure of the gas (e.g., air) in the interior. The tank pressure sensor 86 may produce or generate a tank pressure signal that indicates a magnitude of the pressure present in the tank interior, in a continuous manner or in a periodic manner. Optionally, the tank pressure signal may be produced by the pressure sensor 86 only when the magnitude of the pressure in the tank has fallen below a threshold level.

The controller assembly 80 may additionally include processor circuitry 90 for receiving signals from elements of the system, such as the sensors of the sensor circuitry 82, and sending signals to elements of the system, such as control signals or controlling currents. The processor circuitry 90 is suitable for receiving sensor signals and sending control signals, and the circuitry may include a microprocessor and/or a programmable logic controller. The processor circuitry 90 may be configured to execute a program or series of instructions responsive to various inputs. The processor circuitry 90 may initiate actions by elements of the system upon receipt of inputs from elements of the system.

In an illustrative implementation, upon receipt of the presence detection signal from the animal presence sensor 84, a spray application event may be initiated, the processor circuitry 90 may cause the valve 70 of the sprayer assembly to be moved to the open condition by sending the valve actuating signal to the valve actuating device 72. In some preferred implementations, the sending of the valve actuating signal to the valve actuating device is performed by the processor circuitry after waiting a spray delay time period before sending the signal. The magnitude of the spray delay time period may be predetermined, and the time period may be adjustable.

Waiting to send the valve actuating signal to the valve, and thus delaying the spraying of the substance, may minimize the possibility that the substance may be sprayed prematurely, such as before the animal has sufficiently inserted its head into the hood interior, and thereby increases the likelihood that the sprayed substance reaches the preferred areas of the animal's body, like the top of the head and the neck of the animal.

The processor circuitry 90 may send the valve actuating signal to the valve actuation device 72 of the dispensing apparatus, and may continue sending the signal to the actuation device 72 for including sending the valve actuating signal to the device 72 for a spray maintain time period to cause the actuation device to maintain the valve in the open condition for the maintain time period. The magnitude of the spray maintain time period may be predetermined, and the time period may be adjustable to thereby adjust the amount of the substance applied to an animal at each occurrence.

In some preferred implementations, a time delay may be imposed between spray application events to increase the likelihood that the subsequent application event is being triggered by a different livestock animal than the earlier application event. In some preferred implementations, the processor circuitry 90 may impose or implement an animal interchange delay time period between application events, and thus may wait the interchange delay time period before acting upon a subsequent receipt of the presence detection signal and sending the valve actuation signal to the actuating device 72. While waiting or delaying during the interchange delay time period, the processor circuitry may ignore any presence detection signals received during the animal interchange delay time period. The magnitude of the animal interchange delay time period may be predetermined, and the time period may be adjustable.

The processor circuitry 90 may perform additional functions, such as triggering the pump 76 to operate and pump gas or air into the holding tank 60 to increase the pressure in the tank interior. The triggering of the pump 76 by the circuitry 90 may be responsive to the receipt of a tank pressure signal from the tank pressure sensor 86 which indicates that the pressure in the tank interior has fallen below a threshold pressure level. Illustratively, operation of the pump 76 may be caused by receipt of a pressure increase signal or activating current by the pump to thereby provide electrical power to the pump or actuate a power switch controlling power to the pump. The pressure increase signal may directly operate the pump 76, or the signal may operate a valve which releases pressurized gas from the auxiliary tank of the mechanism 74 to the tank interior 62 of the holding tank.

Optionally, the processor circuitry 90 may discontinue sending the pressure increase signal to the pump 76 when the circuitry 90 detects that the tank pressure signal from the pressure sensor 86 has reached or exceeded a ceiling pressure level. In other embodiments, the pump 76 may be triggered to pump gas into the tank interior periodically, such as after a predetermined period has passed.

The dispensing apparatus 50 may further include a power source 92 which is configured to supply electrical power to elements of the system 10. Illustratively, the power source 92 may be configured to supply electrical power to the tank pressurizing mechanism 74, and also may provide power to the processor circuitry 90. In embodiments, the power source 92 may include a battery 94 configured to store electrical power force applied to the elements of the system. In some embodiments, the battery 94 may be rechargeable to permit replenishment of electrical power stored in the battery. The battery 94 may be replaceable to facilitate power replenishment or periodic repair of the power source 92. The power source 92 may also include a solar panel assembly 96 which is configured to generate electrical power from solar radiation. The solar panel assembly 96 may be in electrical communication with the battery 94 in order to supply electrical power to the battery to recharge the battery. Optionally, the solar panel assembly 96 may provide electrical power directly to elements of the system without the intermediate battery.

It should be appreciated that in the foregoing description and appended claims, that the terms "substantially" and "approximately," when used to modify another term, mean "for the most part" or "being largely but not wholly or completely that which is specified" by the modified term, and may be further quantified as values or qualities which deviate approximately 10 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. An animal substance application system for applying a substance on a portion of a body of an animal, the system comprising:

a feeder apparatus comprising:

a feeder hood having a top and a bottom, the feeder hood defining an interior for holding a quantity of feed toward the bottom of the hood and receiving a portion of the body of the animal consuming the feed, the feeder hood having an opening through which the portion of the body of the animal is movable into the interior of the feeder hood, the opening of the feeder hood being formed by an edge extending continuously about the opening of the hood such that the head of the animal passes between portions of the continuous edge when the animal is moved into the interior for feeding; and a support base for supporting the feeder hood in an elevated condition above a ground surface, wherein the support base of the feeder apparatus includes a hub structure on which the feeder hood is mounted, the feeder hood being rotatable with respect to the hub structure;

a dispensing apparatus configured to dispense the substance onto areas of the body of the animal when the animal has moved the portion of the body into the interior of the feeder hood through the opening, the dispensing apparatus comprising:

a sprayer assembly mounted on the feeder hood, the sprayer assembly including:

a first spray nozzle mounted on the feeder hood above the opening of the feeder hood, the first spray nozzle being oriented to spray the substance downwardly from above the opening toward the body of the animal when the portion of the body of the animal is received in the interior of the feeder hood;

a holding tank for holding in a tank interior a quantity of the substance to be dispensed, the holding tank being closed to permit pressurization of the tank interior;

dispensing conduit fluidly connecting the first spray nozzle to the holding tank;

a valve configured to selectively permit and prevent fluid flow through the dispensing conduit from the holding tank to the first spray nozzle, the valve having an open condition and a closed condition;

a valve actuating device configured to actuate the valve from the closed condition to the open condition; and a tank pressurizing mechanism configured to increase a pressure of gas in the tank interior of the holding tank;

a controller assembly for operating the valve actuating device of the sprayer assembly.

2. The system of claim 1 wherein the controller assembly includes sensor circuitry comprising an animal presence sensor configured to detect a presence of a said animal moving the portion of the body of the animal into the interior of the feeder hood; and wherein the controller assembly is configured to cause the valve actuating device to actuate the valve in response to the animal presence sensor detecting the presence of the animal.

3. The system of claim 2 wherein the controller assembly is configured to:

receive a presence detection signal from the animal presence sensor when the animal presence sensor detects the presence of the animal; and send a valve actuating signal to the valve actuating device of the dispensing apparatus, the valve actuating signal causing the valve actuating device to actuate the valve into the open condition.

4. The system of claim 3 wherein the controller assembly is configured to:

send the valve actuating signal to the valve actuating device for a spray maintain time period to cause the valve actuating device to maintain the valve in the open condition for the spray maintain time period.

5. The system of claim 4 wherein the controller assembly is configured to:

wait a spray delay time period after receiving the presence detection signal from the animal presence sensor before sending the valve actuating signal to the valve actuating device.

6. The system of claim 5 wherein the controller assembly is configured to:

wait an animal interchange delay time period before acting upon a subsequent receipt of the presence detection signal.

7. The system of claim 6 wherein the controller assembly is configured to:

ignore receipt of any presence detection signals received during the animal interchange delay time period.

8. The system of claim 1 wherein the dispensing apparatus includes a power source configured to supply power to elements of the system.

9. The system of claim 8 wherein the power source includes:

a battery configured to store electrical power; and a solar panel assembly configured to generate electrical power from solar radiation, the solar panel assembly being in electrical communication with the battery to supply electrical power to the battery to recharge the battery.

10. The system of claim 1 wherein the first spray nozzle is mounted on the feeder hood toward the top of the feeder hood and the first spray nozzle is oriented to spray the substance outwardly from the feeder hood.

11. The system of claim 10 wherein the sprayer assembly comprises a pair of the spray nozzles including a second spray nozzle mounted on the feeder hood below the opening of the feeder hood, the second spray nozzle being oriented to spray the substance upwardly from below the opening of the feeder hood toward the body of the animal when the portion of the body of the animal is received in the interior of the feeder hood.

12. The system of claim 11 wherein the second spray nozzle is mounted on the feeder hood toward the bottom of the feeder hood and the second spray nozzle is oriented to spray the substance outwardly from the feeder hood.

13. The system of claim 1 wherein all portions of the continuous edge of the hood forming the opening lie in a single plane.

14. The system of claim 1 wherein the feeder hood comprises a hood tub having a top wall portion, a bottom wall portion, and a pair of side wall portions, each of the side wall portions extending downwardly from the top wall portion and being united to the top and bottom wall portions, the top wall portion and the side wall portions forming a top portion and a pair of side portions, respectively, of the continuous edge of the opening of the feeder hood.

15. The system of claim 14 wherein the wall portions of the hood tub are formed by a single molded piece.

16. The system of claim 14 wherein the hood tub includes a front wall portion positioned below the opening of the feeder hood; and wherein the front wall portion forms a bottom portion of the continuous edge of the opening of the feeder hood.

17. The system of claim 16 wherein the hood tub additionally has a rear wall portion; and wherein the rear wall portion, the pair of side wall portions, and the front wall portion of the hood tub form a space for holding a quantity of material for feeding to the animal.

18. An animal substance application system for applying a substance on a portion of a body of an animal, the system comprising:

a feeder apparatus comprising:

a feeder hood having a top and a bottom, the feeder hood defining an interior for holding a quantity of feed toward the bottom of the hood and receiving a portion of the body of the animal consuming the feed, the feeder hood having an opening through which the portion of the body of the animal is movable into the interior of the feeder hood, the opening of the feeder hood being formed by an edge extending continuously about the opening of the hood in a single plane such that the head of the animal passes between portions of the continuous edge when the animal is moved into the interior for feeding, the feeder hood comprising a hood tub having a top wall portion, a bottom wall portion, a pair of side wall portions, and a front wall portion positioned below the opening of the feeder hood, each of the side wall portions extending downwardly from the top wall portion and being united to the top and bottom wall portions, the top wall portion, the front wall portion, and the side wall portions forming a top portion, a bottom portion, and a pair of side portions, respectively, of the continuous edge of the opening; and a support base for supporting the feeder hood in an elevated condition above a ground surface, the support base including a hub structure on which the feeder hood is mounted, the feeder hood being rotatable with respect to the hub structure of the support base; and a dispensing apparatus configured to dispense the substance onto areas of the body of the animal when the animal has moved the portion of the body into the interior of the feeder hood through the opening, the dispensing apparatus comprising:

a sprayer assembly mounted on the feeder hood, the sprayer assembly including:

a first spray nozzle mounted on the feeder hood above the opening of the feeder hood, the first spray nozzle being oriented to spray the substance downwardly from above the opening toward the body of the animal when the portion of the body of the animal is received in the interior of the feeder hood;

a second spray nozzle mounted on the feeder hood below the opening of the feeder hood, the second spray nozzle being oriented to spray the substance outwardly from below the opening of the feeder hood toward the body of the animal when the portion of the body of the animal is received in the interior of the feeder hood;

a holding tank for holding in a tank interior a quantity of the substance to be dispensed, the holding tank being closed to permit pressurization of the tank interior;

a valve configured to selectively permit and prevent fluid flow from the holding tank to the spray nozzles;

a valve actuating device configured to actuate the valve from a closed condition to an open condition; and a controller assembly for operating the valve actuating device of the sprayer assembly, the controller assembly including sensor circuitry with an animal presence sensor configured to detect a presence of a said animal moving the portion of the body of the animal into the interior of the feeder hood, the animal presence sensor being located on an inside of one of the wall portions of the hood tub.

19. The system of claim 18 wherein the wall portions of the hood tub are formed by a single molded piece.

* * * * *